United States Patent
Theel

(10) Patent No.: US 8,762,038 B2
(45) Date of Patent: Jun. 24, 2014

(54) VEHICLE, IN PARTICULAR A HYBRID VEHICLE

(75) Inventor: Thomas Theel, Oberhausen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/988,143

(22) PCT Filed: Sep. 30, 2011

(86) PCT No.: PCT/EP2011/004884
§ 371 (c)(1),
(2), (4) Date: Aug. 2, 2013

(87) PCT Pub. No.: WO2012/065662
PCT Pub. Date: May 24, 2012

(65) Prior Publication Data
US 2014/0058641 A1 Feb. 27, 2014

(30) Foreign Application Priority Data
Nov. 19, 2010 (DE) .......................... 10 2010 051 979

(51) Int. Cl.
*B60T 17/22* (2006.01)

(52) U.S. Cl.
USPC ................ 701/117; 701/36; 701/69; 701/70; 701/71; 701/74; 701/78; 701/81; 701/82; 701/83

(58) Field of Classification Search
CPC ............... B60T 8/17; B60T 8/00; B60T 8/32; B60T 2250/04
USPC ......... 701/117, 36, 69, 70, 71, 74, 78, 81, 82, 701/83
See application file for complete search history.

(56) References Cited

U.S. PATENT DOCUMENTS

| 6,378,960 | B1* | 4/2002 | Demmeler ................... 303/155 |
| 6,681,169 | B2 | 1/2004 | Billig et al. |
| 6,702,404 | B2 | 3/2004 | Anwar et al. |
| 7,400,962 | B2 | 7/2008 | Maier-Landgrebe |
| 8,308,248 | B2 | 11/2012 | Jäger et al. |
| 2004/0059492 | A1* | 3/2004 | Gronau et al. .................. 701/82 |

(Continued)

FOREIGN PATENT DOCUMENTS

| DE | 198 43 221 A1 | 7/1999 |
| DE | 199 20 617 A1 | 9/2000 |

(Continued)

OTHER PUBLICATIONS

International Search Report issued by the European Patent Office in International Application PCT/EP2011/004884.

*Primary Examiner* — Mary Cheung
*Assistant Examiner* — Brian P Sweeney
(74) *Attorney, Agent, or Firm* — Henry M Feiereisen LLC

(57) ABSTRACT

A vehicle has a drive unit driving wheels of a vehicle axle and braking the vehicle via a drive train in drag mode, an electronic control unit measuring actual wheel rotational speeds of the wheels, and a brake booster for reducing the actuating force at the brake pedal. A test unit is assigned to the electronic control unit and performs a plausibility check of the actual wheel rotational speeds in drag mode, wherein the test unit activates during the plausibility check the vehicle brake of one of the vehicle wheels and detects, from the rotational speed behavior of the wheel with a non-activated vehicle brake, whether the measured actual wheel rotational speeds correlate with the actual vehicle speed. A brake booster can be actuated by the test unit during the plausibility check in order to activate the vehicle brake.

15 Claims, 1 Drawing Sheet

(56) References Cited

U.S. PATENT DOCUMENTS

| | | |
|---|---|---|
| 2010/0138117 A1 | 6/2010 | Witte |
| 2010/0198475 A1 | 8/2010 | Stölzl et al. |
| 2011/0106378 A1* | 5/2011 | Takemori et al. ............... 701/36 |
| 2012/0116618 A1* | 5/2012 | Tate et al. ....................... 701/22 |
| 2013/0013151 A1* | 1/2013 | Schafiyha et al. .............. 701/41 |

FOREIGN PATENT DOCUMENTS

| | | |
|---|---|---|
| DE | 100 44 821 A1 | 11/2001 |
| DE | 100 48 251 A1 | 4/2002 |
| DE | 101 41 548 A1 | 9/2002 |
| DE | 101 27 395 | 12/2002 |
| DE | 101 63 208 C1 | 5/2003 |
| DE | 102 21 647 | 7/2003 |
| DE | 10 2006 046 093 | 4/2008 |
| DE | 10 2008 017 478 A1 | 10/2008 |
| DE | 10 2008 017 480 | 10/2008 |
| DE | 10 2007 056 359 | 5/2009 |
| EP | 2 103 494 | 9/2009 |

* cited by examiner

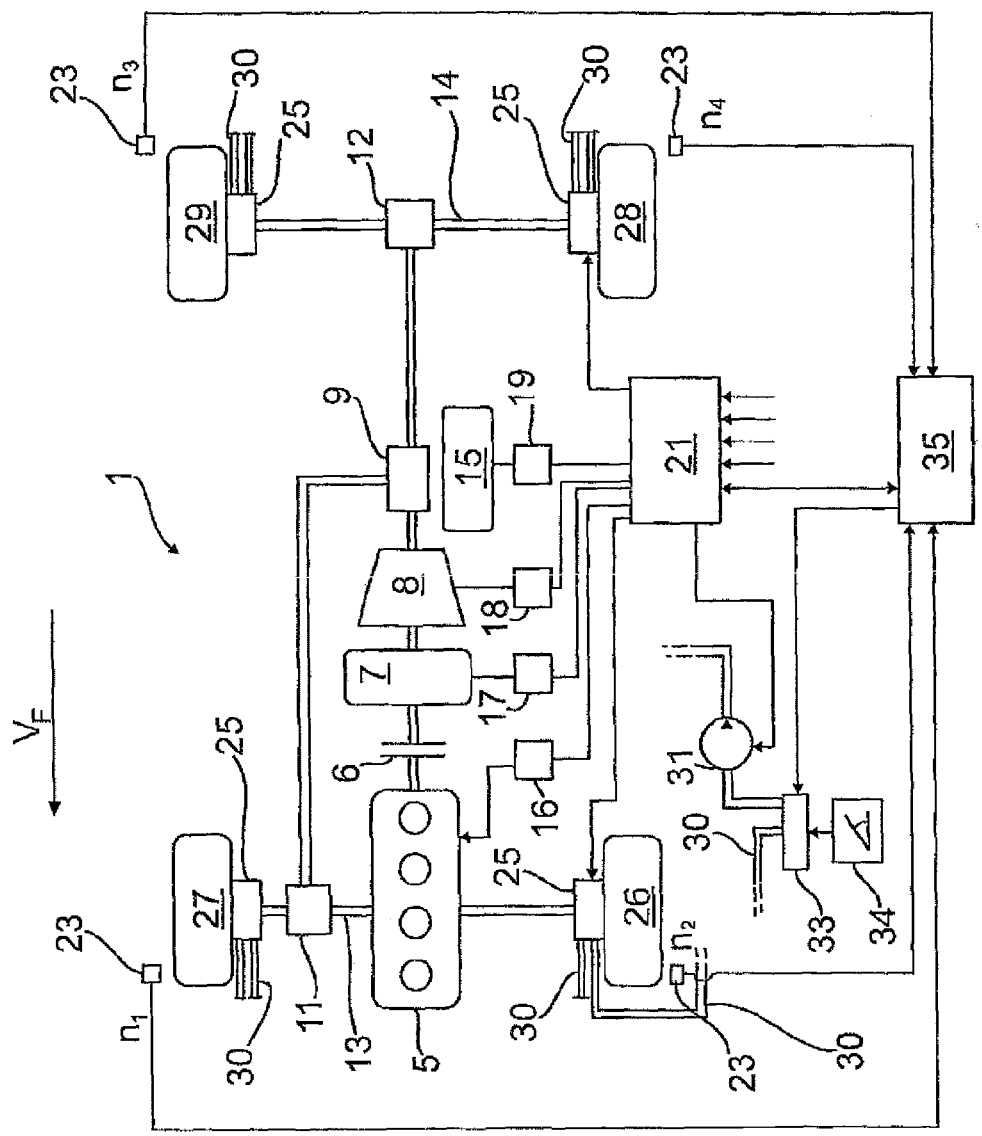

VEHICLE, IN PARTICULAR A HYBRID VEHICLE

CROSS-REFERENCES TO RELATED APPLICATIONS

This application is the U.S. National Stage of International Application No. PCT/EP2011/004884, filed Sep. 30, 2011, which designated the United States and has been published as International Publication No. WO 2012/065662 and which claims the priority of German Patent Application, Serial No. 10 2010 051 979.0, filed Nov. 19, 2010, pursuant to 35 U.S.C. 119(a)-(d).

BACKGROUND OF THE INVENTION

The invention relates to a vehicle, in particular a hybrid vehicle.

A distinction is made with all-wheel-drive vehicles between a selectable all-wheel drive and a permanent all-wheel drive. With a selectable all-wheel drive, the vehicle front axle or the vehicle rear axle can be added if required. In contrast, the permanent all-wheel drive has a rigid drive train. With the rigid drive train, the drive torque generated in the drive unit is distributed substantially uniformly to the front axle and the rear axle via a mechanical interaxle differential, in particular a Torsen differential or a crown gear differential. In this case, individual vehicle wheels cannot be decoupled from the drive train. Rotation speed differences between the vehicle axles are hereby compensated by the interaxle differential.

Such vehicles may have a vehicle dynamic control system, which can be used to counteract swerving of the vehicle by intentionally braking individual vehicle wheels. A generic vehicle with such a vehicle dynamics control system is known from DE 198 43 221 A1, wherein the actual wheel rotation speeds detected by wheel sensors are used as input parameters. Depending on the detected actual wheel rotation speed, the lateral acceleration, the yaw rate and/or the steering angle, the vehicle dynamics control system performs automatic braking intervention on the vehicle brakes of the front and rear wheels. In addition, a brake booster is provided, with which the required actuating force on the brake pedal for attaining a braking effect desired by drivers can be reduced in a known manner. The brake booster according to DE 198 43 221 A1 is a so-called active vacuum brake booster which can be actuated both electrically via the control system and mechanically via a brake pedal.

Especially with vehicles having a partial or complete electrical drive, a recuperation torque, i.e. a drag torque or a negative drive torque, can be transferred to the vehicle wheels via the drive train in a recuperation mode, thereby decelerating the vehicle. This drag torque can cause substantial wheel-brake slip, especially on a road surface having a low friction coefficient (i.e. ice).

With a permanent all-wheel drive with an approximately uniform torque distribution, this brake slip is distributed approximately uniformly to all four wheels, so that both the front wheels and the rear wheels rotate uniformly more slowly due to the brake slip produced in the electric machine. A vehicle speed determined based on these measured actual wheel rotation speeds thus results in a vehicle reference speed that is too low, which misrepresents the actual vehicle speed, although it forms the basis for the vehicle dynamics control. The vehicle dynamic control system detects this condition as partial braking at a higher friction coefficient than is actually present. The actual vehicle speed is greater than that calculated by the vehicle dynamics control system from the wheel signals. This situation was referred to as a so-called "abseiled vehicle reference".

The problem described above is specifically relevant for a permanent all-wheel drive. In contrast thereto, selectable all-wheel drives can disconnect the front axle or the rear axle from the drive train and calculate therefrom meaningful actual wheel rotation speeds that correlate with the actual vehicle speed. However, this type of decoupling from the drive train is not possible with a permanent all-wheel drive.

SUMMARY OF THE INVENTION

It is therefore the object of the invention to provide a vehicle, in which the actual wheel rotation speeds detected by wheel rotation speed sensors can be readily checked for plausibility during a drag operation.

According to one aspect of the invention, in a vehicle with at least one drive unit, with which at least the vehicle wheels of a vehicle axle can be driven and with which the vehicle is braked in drag operation via the drive train, with an electronic control unit which measures as input parameters the actual wheel rotation speeds of the vehicle wheels, and with a brake booster for reducing the actuating force required on the brake pedal, a test unit is associated with the electronic control unit which in drag operation of the vehicle, i.e. when the vehicle is braked via the drive train, automatically performs a plausibility check of the actual wheel rotation speeds measured by the wheel rotation speed sensors. The plausibility check of the invention can particularly be applied and performed in all-wheel drive hybrid vehicles with a relatively rigid torque distribution, large differential lock-up values and vehicle axles and vehicle wheels that cannot be decoupled, but may also be applied for a single vehicle axle connected in the drive train. In a simple embodiment with only a single driven axle of the vehicle, the test unit may perform the plausibility check by activating the vehicle brake of one of the vehicle wheels and/or disengage a selectable axle. Based on the resulting behavior of the vehicle wheel rotation speed when the vehicle brake is not activated, the test unit detects whether or not the measured actual wheel rotation speeds correlated with the actual vehicle speed. In a particularly preferred embodiment, the test unit is in signal communication with the brake booster of the vehicle. The brake booster can be controlled in the plausibility check by the test unit for activating the vehicle brake.

The test unit according to the invention can be understood to form a program block in the ESP control unit. For example, the test unit may be implemented as a software algorithm in the ESP control unit.

The brake booster as well as an ESP pump associated with the electronic control unit may be connected to a hydraulic braking circuit of the vehicle together with the vehicle brakes and other conventional switching elements which will not be described in detail here. The brake booster as well as the above-mentioned ESP pump hereby forms actuators, which cause buildup of a braking pressure in each brake of the vehicle selected by the control unit.

According to the invention, the brake booster may be operated mechanically as a so-called active booster via the brake pedal as well as controlled electrically by the test unit. The use of the brake booster for the plausibility check is advantageous compared to the use of the ESP pump because no noise is generated due to an ESP pump start, because depending on the component design there is hardly any brake pedal feedback when the driver brakes during this process, and defined and precise pressure settings are available. It is therefore important for the invention that the plausibility check be carried out by the ESP control via the active booster.

Against this background, it is particularly preferred when the ESP pump is controlled according to the invention exclusively by the electronic control unit in the driving mode for vehicle dynamics control, and swerving of the vehicle can be counteracted in particular by intentionally braking individual vehicle wheels based on the measured actual wheel rotation speeds, the yaw rate, the lateral acceleration and/or the steering angle. To perform a reliable vehicle dynamics control, it is therefore of particular relevance, that the actual wheel rotation speeds serving as a basis for vehicle dynamics control are checked for plausibility.

During the vehicle dynamics control, the brake pressure during hydraulically operated vehicle braking is built up by controlling the aforementioned ESP pump, whereas the ESP pump remains shut off during the plausibility check, using only the brake booster as actuator for building up the brake pressure in the selected vehicle brake(s).

When the wheel rotation speed of the vehicle remains approximately the same during the plausibility check, i.e. when the vehicle brake is not activated, there is little or no brake slip between the driven vehicle wheels and the road surface. In this case, the test unit detects that the detected actual wheel rotation speeds correlate with the actual vehicle speed in the drag operation.

Conversely, when the wheel rotation speed of the vehicle wheel increases or decreases during the plausibility check with a non-activated vehicle brake, the test unit detects a brake slip between the vehicle wheels and the road surface in drag operation. In this case, the vehicle wheels rotate too slowly or too fast in relation to the actual vehicle speed, i.e. 100% of the braking energy cannot be dissipated to the road surface in drag operation, meaning that there is a loss of adhesion of the vehicle wheels.

When an aforedescribed slip is detected by the test unit, the electronic control unit can take measures to reduce the brake slip. In the presence of brake slip, for example, the electronic control unit may reduce a drag torque that can be maximally dissipated by the drive unit in drag operation.

In the case of a hybrid vehicle, the drive unit may include an internal combustion engine and an electric machine. During the recuperation, the electric motor generates a recuperation torque, which is applied via the drive train as a braking torque to the driven vehicle wheels. When the test unit detects a wheel slip during the drag operation, the electronic control unit can control the power electronics of the electrical machine as a measure for reducing the brake slip. An upper limit for the maximum dissipatable recuperation torque can then be reduced and/or calculated so as to prevent the brake slip in drag operation of the vehicle. This also applies to exclusively electric vehicles of different drive configurations.

As already mentioned above, the present plausibility check according to the invention is particularly relevant in a permanent all-wheel drive with a mechanical interaxle differential/center differential, in particular with a Torsen differential or crown gear differential, wherein the four vehicle wheels cannot be decoupled from the rigid drive train and the large differential lock-up torque values are present. Wheel rotation speed differences are therefore balanced by the center differential. Unlike with a single axle drive, the drag torque is applied approximately uniformly to the four vehicle wheels with permanent all-wheel drive. Since the vehicle wheels cannot be decoupled with a permanent all-wheel drive, approximately uniform brakes slip results on all four wheels in drag operation in the event that the braking energy cannot be completely dissipated to the road surface. The vehicle reference speed determined based on the actual wheel rotation speeds is therefore less than the actual vehicle speed due to the undetected brake slip.

With the above-mentioned permanent all-wheel drive, the plausibility check is performed by so-called trimming of the four vehicle wheels, wherein the vehicle brakes of individual or diagonally opposed vehicle wheels are respectively activated, whereas the remaining other vehicle wheels are left with a non-activated vehicle brake, i.e. unbraked. This forces the interaxle differential open, so that the now braked vehicle wheels experience an even greater brake slip, while the two unbraked vehicle wheels may turn at an increased speed. In this case, the test unit recognizes that a brake slip has occurred during drag operation, which distorts the reference vehicle speed underlying the vehicle dynamics control.

BRIEF DESCRIPTION OF THE DRAWING

An exemplary embodiment of the invention will now be described with reference to the appended drawing, which shows in:

FIG. 1 a schematic diagram of a vehicle with all-wheel drive system.

DETAILED DESCRIPTION OF PREFERRED EMBODIMENTS

FIG. 1 shows a vehicle with all-wheel drive system 1. The all-wheel drive vehicle has as drive units an internal combustion engine 5, in conjunction with a clutch 6, an electric machine 7 and a variable speed transmission 8 connected in series in a drive train. The transmission output shaft 9 is coupled to an interaxle differential which is drive-connected in each case with a front axle differential 11 and a rear axle differential 12. The interaxle differential 9 is in the present example a Torsen differential, in which the front axles and rear axles 13, 14 cannot be decoupled. Accordingly, a rigid drive train for a permanent all-wheel drive is shown in the embodiment of FIG. 1. There is consequently a relatively rigid torque distribution with relatively large differential lock-up values with non-disengageable vehicle axles 13, 14 and vehicle wheels 26 to 29.

Respective control units 16 through 19 are associated with the two drive units 5, 7 as well as the gear 8 and the traction battery 15 for supplying power to the electric machine 7. The control units 16 to 19 can be controlled in response to different input parameters, such as a driver-side input or other input parameters, by way of an electronic control unit 21. A vehicle dynamic control system is also integrated in the electronic control unit 21, which performs automatically braking force interventions on the vehicle brakes 25 of the front wheels 26, 27 and rear wheels 28, 29 to provide vehicle dynamics control as a function of the wheel rotation speeds $n_1$ to $n_4$ measured by wheel rotation speed sensors 23. From the wheel rotation speeds $n_1$ to $n_4$ measured by the wheel rotation speed sensors 23, the control unit 21 determines a vehicle reference speed, which is supposed to represent the actual vehicle speed $v_F$.

As is generally known, the vehicle brakes 25 of the vehicle wheels 26 to 29 are connected in a hydraulic brake circuit 30, which is only schematically indicated in FIG. 1. For example, an ESP pump 31 and a conventional brake booster 33 are integrated in the hydraulic brake circuit 30, in addition to unillustrated switching components which can be controlled by the control circuit 21. The brake booster 33 may be operated mechanically in known manner via a brake pedal 34 or may alternatively be controlled electrically via a test unit 35 to be described below.

To carry out a vehicle dynamics control, the vehicle brakes 25 are controlled by activating the ESP pump 31 and by suitable actuation of the switching components arranged in the hydraulic circuit 30 so that the swerving is prevented when the vehicle is driven. The brake booster 33 is hereby not operating, so that the brake pressure is built up exclusively by the ESP pump 31. The active booster is activated when significant vehicle instabilities occur, so as to displace liquid volumes and to thereby support the pressure buildup by the ESP pump.

As mentioned above, the test unit 35 according to the invention performs in a drag operation a plausibility check of the actual wheel rotation speeds $n_1$ to $n_4$ measured by the wheel sensors 24. Such a plausibility check is required for the following reason:

The electrical machine 7 connected in the drive train can recharge the traction battery 15 during a recuperation. The recuperation torque generated by the electric machine 7 is transferred as a drag torque or negative torque to the vehicle wheels 26 to 29, thereby causing braking of the vehicle via the drive train. There is a risk with an excessively large drag torque and/or with a road surface having a low friction coefficient that the braking energy is not fully dissipated on the road surface, resulting in a brake slip on all four wheels 26 to 29 with an approximately uniform torque distribution. Without the plausibility check according to the invention, this would result in a meaningless vehicle reference speed which may in turn cause uncontrolled vehicle reactions.

When the plausibility check is performed in drag operation, the vehicle brakes 25 on diagonally opposed vehicle wheels are activated. For example, according to FIG. 1, the vehicle brake 25 on the right front wheel 27 and the vehicle brake 25 on the left rear wheel 28 are activated. To build up the brake pressure, the test unit 35 does not control the ESP pump 31, but instead controls the brake booster 33 and optionally the switching components (integrated in the ESP) also located in the brake circuit 30, in order to increase the brake pressure on the selected vehicle brakes 25 via a defined pressure gradient and/or different defined pressure levels. The brake slip on the right front wheel 27 and the left rear wheel 28 is thereby increased, whereas the other two vehicle wheels 26, 29 remain unbraked. The test unit 35 recognizes based on the rotation speed ratios or rotation speeds obtained on the unbraked vehicle wheels 26, 29 whether or not a brake slip occurs during drag operation. When the wheel rotation speeds $n_2$ and $n_3$ of the respective unbraked opposite unbraked vehicle wheels 26, 29 increase after the brake is applied on the vehicle wheels 27, 28, the test unit 35 detects an implausible wheel pattern, wherein the four vehicle wheels 26 to 29 rotate slowly too in relation to actual vehicle speed $v_F$.

The result of the plausibility check is transmitted from the test unit 35 to electronic control unit 21, which initiates appropriate measures in the presence of a brake slip. By way of example, the control unit 21 may control the power electronics 17 of the electric machine 7 in order to reduce a maximum allowable recuperation torque. For example, the recuperation torque may be reduced from about 200 Nm to 20 Nm. Such measures reduce the braking energy to be dissipated to the vehicle wheels 26 to 29, thereby consequently also reducing the brake slip. The wheel rotation speed of the vehicle wheels 26 to 29 automatically increases due to the reduction of the recuperation torque. The wheels rotate again in the stable slip range. The reference vehicle speed determined based on the measured actual speeds $n_1$ to $n_4$ then approaches the actual vehicle speed $v_F$.

The invention claimed is:

1. A vehicle, comprising:
    at least one drive unit configured to drive at least the vehicle wheels of a vehicle axle and to brake the vehicle in drag operation via drive train,
    an electronic control unit configured to measure as input parameters actual wheel rotation speeds of the vehicle wheels,
    a brake booster for reducing an actuating force of a brake pedal, and
    a test unit associated with the electronic control unit and in signal communication with the brake booster, wherein the test unit performs in drag operation a plausibility check of the measured actual wheel rotation speeds and activates a vehicle brake of one of the vehicle wheels based on a result of the plausibility check and detects based on the speed characteristics of another vehicle wheel with a non-activated vehicle brake whether the measured actual wheel rotation speeds correlate with an actual vehicle speed.

2. The vehicle of claim 1, wherein the electronic control unit automatically actuates vehicle brakes in driving mode for providing vehicle dynamics control based on the measured actual wheel rotation speeds.

3. The vehicle of claim 2, further comprising an adjusting pump connected in a hydraulic brake circuit of the vehicle brakes and controlled by the electronic control unit during the vehicle dynamics control to build up brake circuit pressure, wherein the adjusting pump is shut down during the plausibility check performed in drag operation.

4. The vehicle of claim 1, wherein when the wheel rotation speed of the vehicle wheel with a non-activated vehicle brake remains substantially unchanged during the plausibility check, the test unit determines that no brake slip exists between the vehicle wheels and a road surface and that the measured actual wheel rotation speeds correlate with or match the actual vehicle speed.

5. The vehicle of claim 1, wherein when the wheel rotation speed of the vehicle wheel with a non-activated vehicle brake increases during the plausibility check, the test unit determines that brake slip exists between the vehicle wheels and a road surface and that the vehicle wheels rotate too slowly relative to the actual vehicle speed.

6. The vehicle of claim 5, wherein the electronic control unit reduces a drag torque which the drive unit is at most able to dissipate in drag operation.

7. The vehicle of claim 1, wherein the drive unit comprises an internal combustion engine and at least one electric machine which generates in drag operation a recuperation torque acting as a drag torque, wherein the electronic control unit adjusts a limit for a maximally dissipatable recuperation torque by controlling power electronics of the electric machine.

8. The vehicle of claim 1, wherein the vehicle has a permanent all-wheel drive with a mechanical interaxle differential which drives front wheels and rear wheels via respective front differentials and rear differentials and wherein the front wheels and rear wheels are prevented from being decoupled from the drive train.

9. The vehicle of claim 8, wherein torque is approximately uniformly distributed to the front wheels and the rear wheels.

10. The vehicle of claim 8, wherein the interaxle differential comprises a crown gear differential or a Torsen differential.

11. The vehicle of claim 8, wherein the test unit trims the vehicle wheels during the plausibility check by activating vehicle brakes on diagonally opposed vehicle wheels, and checks a rotation speed characteristic of vehicle wheels having non-activated vehicle brakes.

12. The vehicle of claim 11, wherein the diagonally opposed vehicle wheels are the left front wheel and the right rear wheel, and the right front wheel and the left rear wheel, respectively.

13. A method for performing a plausibility check of actual wheel rotation speeds of vehicle wheels of a vehicle measured in drag operation, comprising:
- activating with a test unit a vehicle brake of one of the vehicle wheels,
- controlling with the test unit a brake booster during the plausibility check for activating the vehicle brake, and
- measuring based on a speed characteristic of the vehicle wheel having a non-activated vehicle brake whether the measured wheel rotation speed correlates with an actual vehicle speed.

14. The method of claim 13, wherein when the wheel rotation speed of the vehicle wheel with a non-activated vehicle brake remains substantially unchanged during the plausibility check, the test unit determines that no brake slip exists between the vehicle wheels and a road surface and that the measured actual wheel rotation speeds correlate with or match the actual vehicle speed.

15. The method of claim 13, wherein when the wheel rotation speed of the vehicle wheel with a non-activated vehicle brake increases during the plausibility check, the test unit determines that brake slip exists between the vehicle wheels and a road surface and that the vehicle wheels rotate too slowly relative to the actual vehicle speed.

* * * * *